INVENTOR.
EDWIN J. KEYSER

BY Woodling + Krost

ATTORNEYS

May 16, 1961 E. J. KEYSER 2,984,124
INERTIA MASS CRANK TRANSMISSION
Filed Dec. 15, 1958 8 Sheets-Sheet 7

INVENTOR.
EDWIN J. KEYSER
BY Woodling + Krost
ATTORNEYS

May 16, 1961 — E. J. KEYSER — 2,984,124
INERTIA MASS CRANK TRANSMISSION
Filed Dec. 15, 1958 — 8 Sheets-Sheet 8

INVENTOR.
EDWIN J. KEYSER
BY Woodling & Krost
ATTORNEYS

United States Patent Office 2,984,124
Patented May 16, 1961

2,984,124
INERTIA MASS CRANK TRANSMISSION
Edwin J. Keyser, 6 Valley Drive, Billings, Mont.
Filed Dec. 15, 1958, Ser. No. 780,274
12 Claims. (Cl. 74—751)

The invention relates in general to inertia mass transmission and more particularly to transmissions wherein the inertia mass is utilized in combination with gear crank means to transmit a torque from a drive or input shaft to a driven or output shaft.

An object of the invention is to provide a transmission which has an infinitely variable speed ratio.

Another object of the invention is to provide an automatically controlled transmission.

Another object of the invention is to provide a manually controlled transmission.

Another object of the invention is to provide a transmission which has means to vary the speed output thereof.

Another object of the invention is to provide a transmission which has means to vary the torque output thereof.

Another object of the invention is to provide a transmission for controlling the relative speed between the input shaft and the output shaft.

Another object of the invention is to provide a transmission for controlling the relative torque between the input shaft and the output shaft.

Another object of the invention is to provide a transmission which utilizes planetary gear crank means in combination with one or more masses whereby the gear crank means serves to accomplish a shortened high speed period of the mass or masses and a lengthened low speed period of the mass or masses to guide the directions of the inertia forces so that they become usable as reaction means.

Another object of the invention is to provide a transmission which utilizes secondary gear crank means in combination with mass means whereby the gear crank means serves to guide the directions of the inertia forces of the mass means so that they become usable as reaction means. When this is accomplished then the reaction means effectively acts upon the planet gears, in referring to that specific modification, whereby torque is transmitted from an input shaft to an output shaft.

Other objects and a fuller understanding of the invention may be had by referring to the following description and claims, taken in conjunction with the accompanying drawing, in which:

In speaking of the invention in general and generically referred to, it should be pointed out that all of the devices include an input or drive shaft and an output or driven shaft. In most of the instances, what has been referred to as a carrier or its mechanical equivalent is secured to the input shaft. A sun gear or what may otherwise be referred to as a first or primary gear, is secured to the output shaft and a plurality of planet gears or what may also be referred to as secondary gears are journalled and engage the sun gear. It will be readily recognized that in any instance the mechanical equivalent of this structure may be made by utilizing only a single planet or secondary gear. A crank arm is secured to the secondary gear and a slotted member means is generally provided for the reception of the crank arm. There is provided a means for operatively connecting the input and the output shafts and this includes an inertia mass which acts through the engaged primary and secondary gear teeth tending to drive the output shaft.

Figures 1, 2, 3, 4:
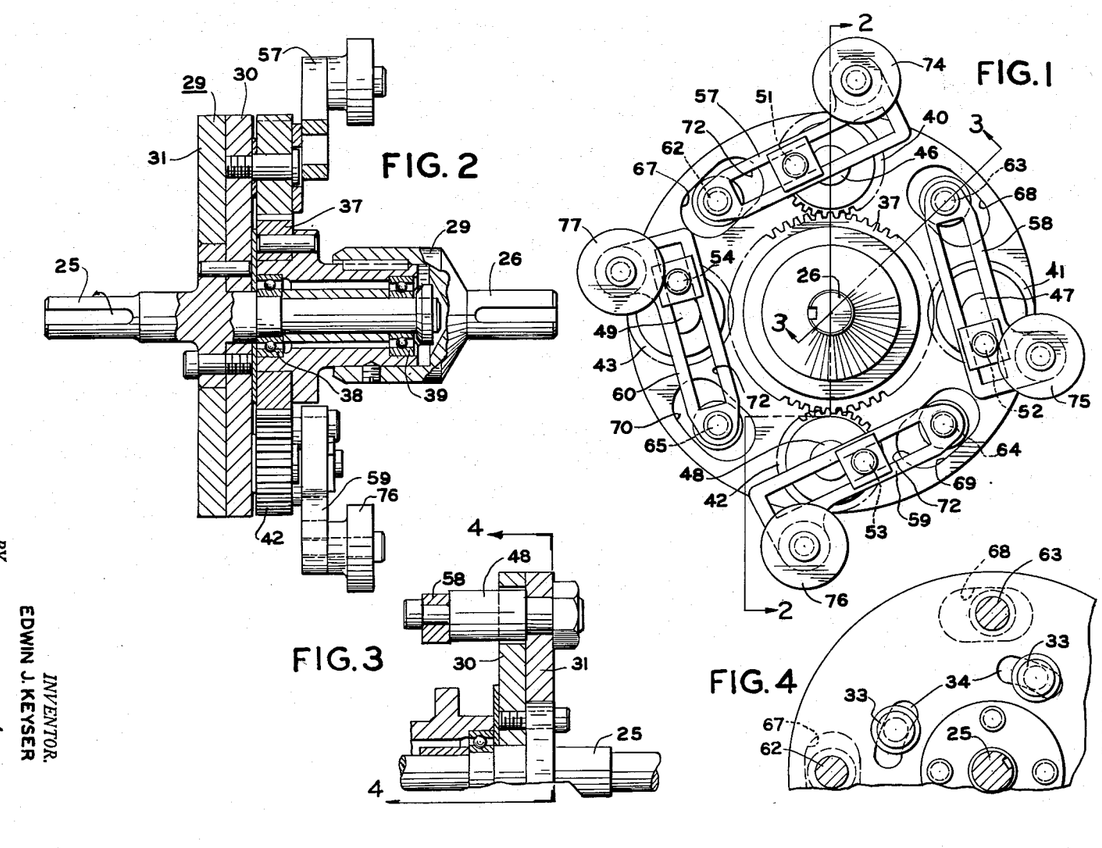
Figure 1 is an elevational view of a transmission constructed under the teachings of the present invention.
Figure 2 is a left end view of the device shown in Figure 1.
Figure 3 is a fragmentary view taken generally along the line 3—3 of Figure 1.
Figure 4 is a view taken generally along the line 4—4 of Figure 3.
Figures 5, 6, 7, 8:
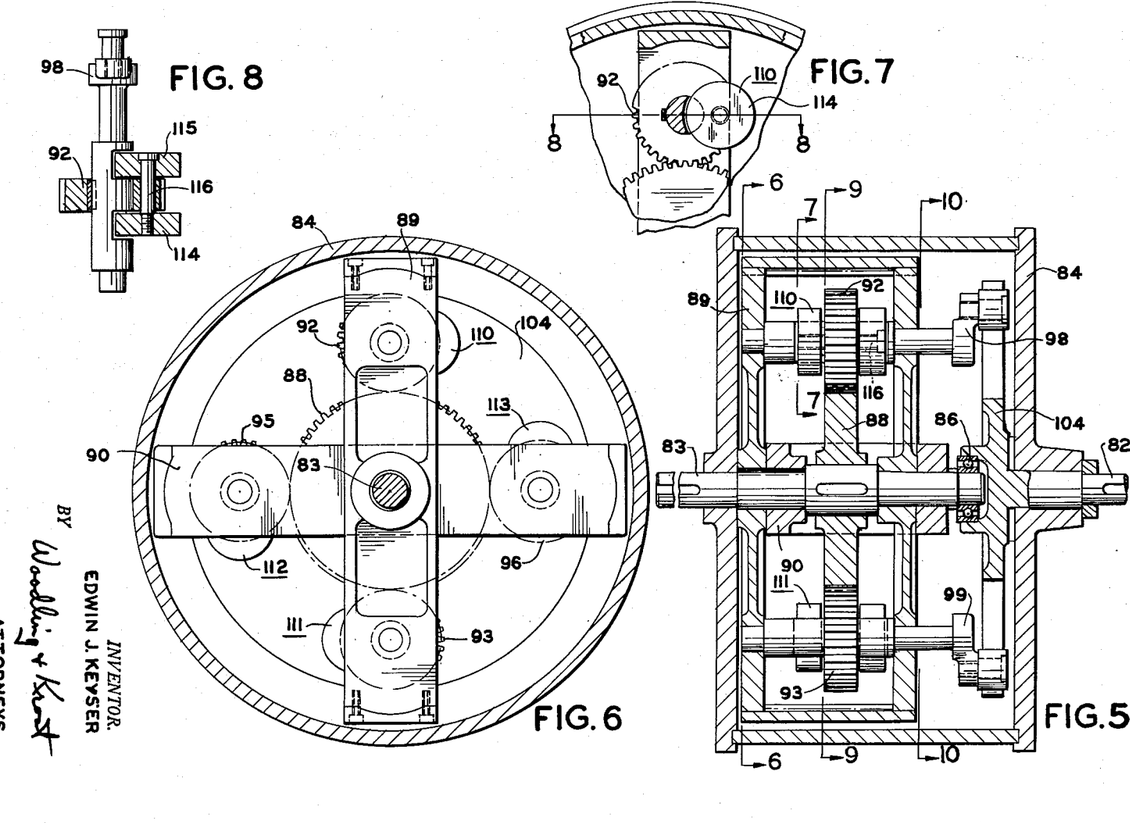
Figure 5 is a side elevational view in section showing another transmission constructed in accordance with the teachings of the present invention.
Figure 6 is a view taken generally along the line 6—6 of Figure 5.
Figure 7 is a fragmentary view taken generally along the line 7—7 of Figure 5.
Figure 8 is a view taken generally along the line 8—8 of Figure 7.
Figure 9:
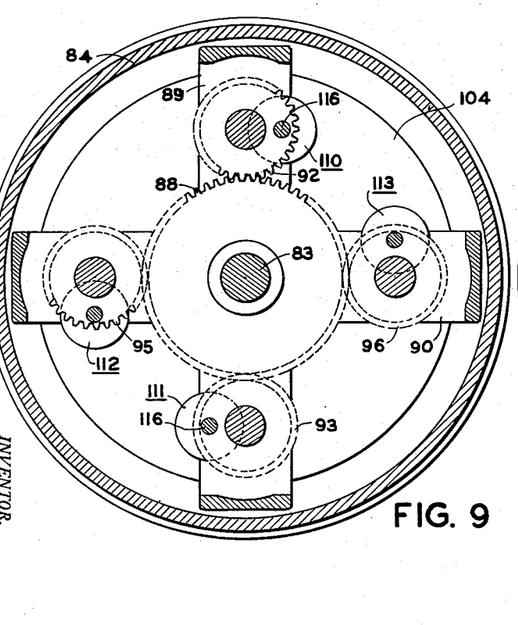
Figure 9 is a view taken generally along the line 9—9 of Figure 5.
Figure 10:
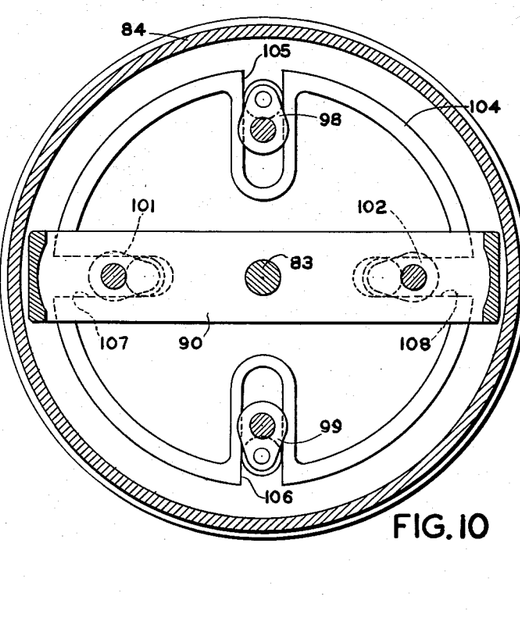
Figure 10 is a view taken generally along the line 10—10 of Figure 5.

Referring specifically to the transmission illustrated in Figures 1–4, it will be noted that this transmission includes an input shaft 25 and an output shaft 26. Secured to the input shaft 25 is a carrier 29 which includes first and second plate members 30 and 31, respectively. The first plate member 30 is fixedly connected to the input shaft 25. The second plate 31 is connected to the first plate 30 by means of screws 33. The screws 33 extend through slots 34 in the second plate 31 as best seen in Figure 4 and upon loosening of the screws 33, the plate 31 may be shifted circumferentially with respect to the first plate 30. A primary or sun gear 37 is secured by suitable means to the output shaft 26 to rotate therewith. The input shaft 25 and output shaft 26 are effectively journalled by each other by means of bearings 38 and 39. A plurality of planet gears, specifically four in number, 40 through 43, are journalled on the carrier 29 on shafts 46 through 49 respectively and each engages the sun gear 37. A plurality of crank arms 51—54 are formed on the respective planet gears by means of pins which extend from a face of the planet gear. A plurality of members 57—60 are provided and each of these members have a first and a second end portion. The first end portion of each of these members is pivotally mounted on the carrier 29 by pivot means 62—65, respectively. Each of the pivot means 62—65 respectively, extend through slots 67—70 in the first plate 30 and are appropriately fastened to the second plate 31. Wall means are provided on each of the members 57—60 and these wall means provide a crank arm slot 72 in each of the members 57—60. The crank arms 51—54 respectively, reside in the crank arm slot of its respective member 57—60. Secured to the second end portion of the members 57—60 are mass members 74—77, respectively. The means of mounting the mass members is to mount them in such a way that they are free to rotate with respect to the end portion to which they are connected.

The transmission illustrated in Figures 5-10 includes an input shaft 82 and an output shaft 83 mounted within a housing 84. The input shaft 82 is supported by the housing and the left end of the input shaft turns on a bearing 86 which bearing also supports and journals the right end of the output shaft 83. The left end of the output shaft is journalled in the housing in a manner similar to the right end of the input shaft. A sun or primary gear 88 is fixedly secured to the output shaft 83 for rotation therewith. First and second carriers 89 and 90 are journalled for independent movement on the output shaft 83. First and second planet gears 92 and 93 respectively, are carried and journalled by the first carrier 89 and engage the sun gear 88. The second carrier 90 carries and journals third and fourth planet gears 95 and 96. These two planet gears are on opposite sides of the sun gear as are the gears 92 and 93, and also engage the sun gear. The shafts which rotatively mount the planet gears 92 and 93 are respectively provided with integral crank arms 98 and 99. The shafts which mount the planet gears 95 and 96 are also respectively provided with integral crank arms numbered 101 and 102. Secured to the input shaft is a member or drive plate 104 which is provided with four slots numbered 105-108. The slots 105 and 106 receive the crank arms 98 and 99 whereas the slots 107 and 108 receive the crank arms 101 and 102, respectively. Masses 110 through 113 are respectively carried by the planet gears 92, 93, 95, and 96, and each of the masses includes first and second members 114 and 115 on opposite sides of its respective planet gear and secured by means of a pin 116 which extends through the planet gear off its center and is fastened into the members 114 and 115 at its respective end portions. It will be appreciated from a review of the drawings that the masses are mounted on their respective planet gears in such manner that they may rotate with respect to the planet gear. It should also be pointed out that the two carriers referred to; namely 89 and 90, are in effect independent of each other and the instant transmission functions on the same principle regardless of whether one or two carriers is utilized.

Figure 11:
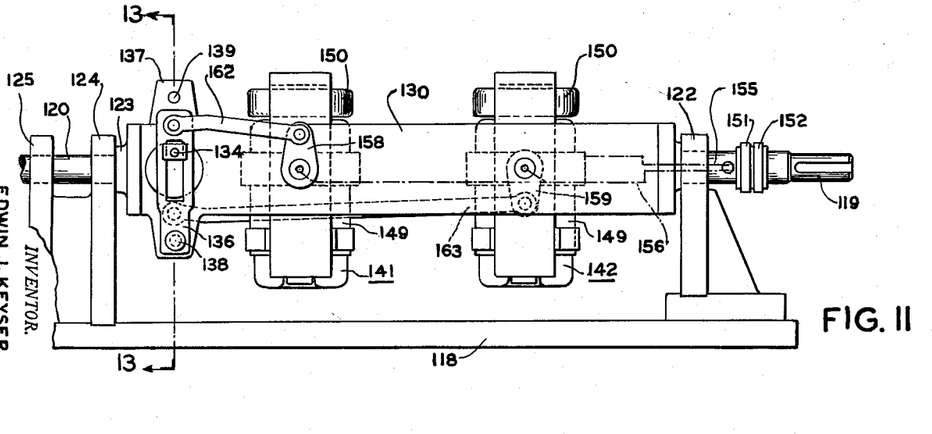
Figure 11 is a side elevational view of another transmission constructed under the teachings of the present invention.
Figure 12:
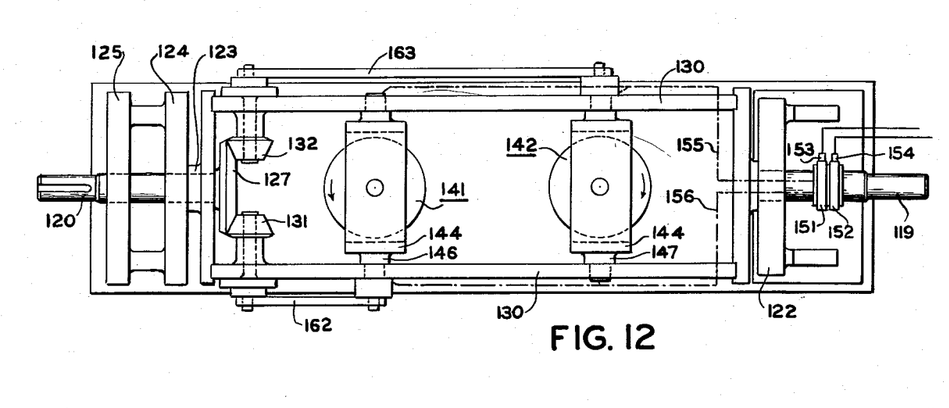
Figure 12 is a plan view of the transmission shown in Figure 11.
Figure 13:
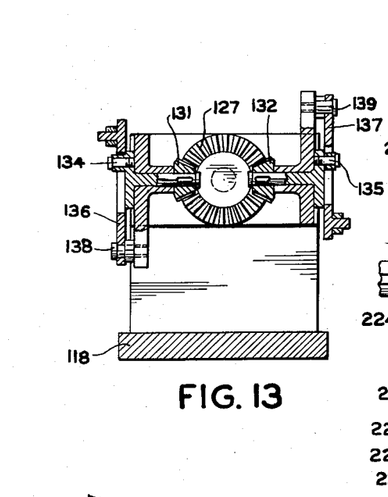
Figure 13 is a view taken generally along the line 13—13 of Figure 11.

The transmission shown in Figures 11, 12 and 13 includes a base 118 and input and output shafts 119 and 120, respectively. The input shaft is journalled in an upstanding member 122 which extends from the base 118. The output shaft 120 is journalled in upstanding members 124 and 125 which extend from the base 118. A primary or sun gear 127 is secured to the output shaft 120 for rotation therewith. A carrier 130 is secured to the left end of the input shaft 119 for rotation therewith and is journalled at its left end 123 about the right end portion of the output shaft 120. First and second secondary or planet gears 131 and 132 respectively, are connected to stub shafts mounted in opposed side walls of the carrier 130. Each of these planet gears, as they may be referred to, are continuously in engagement with the sun gear 127.

Crank arms 134 and 135 respectively, are secured to the same shafts as the respective planet gears 131 and 132. First and second slotted arms 136 and 137 are provided and pivot means 138 and 139 respectively connect end portions of the first and second slotted arms to opposite side walls of the carrier 130. The crank arms 134 and 135 respectively reside in the slots in the slotted arms 136 and 137. First and second gyroscopes 141 and 142 are mounted by the carrier 130 in such manner that they are able to rotate or oscillate on an axis which is generally transverse to the input and output shafts. Each of the gyroscopes is mounted by means of a bracket or saddle 144 which in turn is connected to what may be referred to as a shaft or pivot means 146 and 147, respectively. Each of the gyroscopes also includes a motor 149 and a mass 150. The motors 149 enable or provide the power for revolving the masses 150 about the respective axes of the gyroscopes. Means are provided for supplying power to the gyroscope motors 149 and this means includes first and second collector rings 151 and 152 and power is supplied to these collector rings by brushes 153 and 154, respectively. Extending respectively from the collector rings 151 and 152 are conductors 155 and 156 and these conductors have been shown only schematically as extending to the respective pivot means 146 and 147 of the gyroscopes. It will be readily appreciated by those skilled in the art that the power may be transmitted to the gyroscope motors in this manner or by many other means. This specific showing has utilized an electrical means of rotating the gyroscope masses, however, other means such as mechanical, hydraulic, and pneumatic may also be utilized. Arms 158 and 159 respectively, are connected to the pivot means 146 and 147 of the gyroscopes and rotate or oscillate in accordance therewith. Links 162 and 163 are utilized and serve to connect the arms 158 and 159 at one end portion thereof and the slotted arms 136 and 137 at the other end portion thereof.

The transmission illustrated in Figures 14-18 includes a housing 165 which carries an input shaft 166 and an output shaft 167. The input shaft 166 is mounted upon bearings 170 and 171 respectively, and the output shaft is journalled at its left end portion by a bearing 172 and at its right end portion by a bearing 173 which is carried by the left end portion of the input shaft. A primary or sun gear 176 is fixedly secured to the output shaft 167 and is adapted to rotate therewith. First and second inertia mass members 179 and 180 respectively, are mounted by the output shaft 167 and are journalled for independent rotation with respect thereto on bearings 182 and 183, respectively. The first inertia mass member 179 has connected thereto, a journalling member 186 which is mounted on the output shaft and journaled for independent movement with respect thereto on a bearing 187. The second inertia mass member 180 has connected thereto, a journalling member 188 and this member 188 is also mounted on the output shaft on a bearing 189 which permits independent rotation with respect thereto. First and second planet gears 192 and 193 are mounted on shafts 196 and 197 respectively and one end of the shafts 196 and 197 are rotatively carried by the inertia mass member 179 and the other end of the shafts are carried by the journalling member 186. Third and fourth planet gears 199 and 200 are mounted on shafts 202 and 203 respectively, and one end portion of the shafts 202 and 203 is journalled in the inertia mass member 180 whereas the other end portion of the shafts are rotatively journalled in the journalling member 188. All of the planet or secondary gears mentioned are in continuous engagement with the sun gear 176. It will be noted that the inertia mass member 179 is provided with first and second slots 205 and 206 and through these two slots respectively extend the shafts 202 and 203. Secured respectively to the ends of the shafts 196, 197, 202 and 203 are crank arms 208—211. A drive plate 213 is secured to the input shaft 166 by means of screws 214 and this plate is provided with four slots 216—219. The ends of the crank arms 208—211 respectively, reside and are adapted to move within the slots 216—219. It will be specifically noted that the slots 216—219 are at an angle with respect to a radius of the drive plate 213 and are tilted or tipped into the direction of a clockwise rotation of the plate as viewed in Figure 15.

In describing the operation of the transmissions illustrated in Figures 1–18, assume that they are applied as the transmission of a motor vehicle. Assume that the vehicle is being started from a standing stop and is to be accelerated to a moderate speed along a level roadway. In the beginning with the engine running at a slow speed and prior to the torque being sufficient to start the vehicle in motion there is a pulsation of energy flowing into each inertia mass and out again. The mechanisms are so arranged that the planet or secondary gears will be rotating about the sun or primary gear and the inertia force resulting from both the addition of kinetic energy and the giving up of kinetic energy of each of the masses tends to restrict the rotating of each of the planets about its own axis thereby resulting in a force in the forward direction of the sun gear and output shaft. Assuming a clockwise direction of rotation of the input shaft of the respective transmissions described above and as viewed in Figures 1, 6, 13 and 16, the movement of the planet gears about the sun gear will be in a clockwise direction and the planet gears will initially be caused to rotate about their own axes also in a clockwise direction. The interengagement of the crank arm in the slot of its member and the engagement of the planet and sun gear teeth in combination with the mass serves to offer a restriction to the clockwise rotation of the planet gears about their own axes and this tends to transmit a force from the input to the output shaft tending to supply the torque required by the output shaft. It should be pointed out that with the transmissions of Figures 1–13 that they are capable of going into high gear or a one-to-one ratio. This occurs when the inertia forces are such as to offset the tendency of the planet gears to rotate about their own axes and in this condition the planet gear and sun gear teeth are effectively locked together. It is possible to change the capacity of the transmission of Figures 1–4 by varying the relationship of the mass with respect to the pivot point of the slotted member and the respective crank arm. Another factor which would vary the capacity of the instant transmission would be the position of the crank arm with respect to the planet gear axis. As a specific means of varying the capacity of the instant transmission, structure has been provided by means of the first and second plates 30 and 31 whereby the pivot means 62—65 and their respective masses are shifted with respect to the cranks and planet gears. This structure may be referred to as means for varying the capacity of the transmission. This is done by loosening the screws 33 and shifting the second plate 31 which carries the pivot means circumferentially with respect to the first plate 30 which carries the planet gears and cranks. The second plate 31 may be shifted in a manner to bring the pivot means closer to the crank arm and planet gears or it may be shifted in the opposite direction. Shifting the pivot means closer to the crank arms effectively increases the amplitude of the mass whereas shifting the pivot means away from the crank arm lessens the amplitude of the mass. When the amplitude is increased, the capacity of the transmission is also increased and when the amplitude is lessened then the capacity of the transmission is also reduced or lessened. After this has been accomplished the screws 33 are retightened to fixedly locate the plates 30 and 31 with respect to each other. It should be readily appreciated by those skilled in the art that many means might be utilized for varying the above referred to elements with respect to each other and these may be either manual or automatic means. In referring to the transmission of Figures 5–10 it should be pointed out that the capacity of the same may be changed by varying the angle between the crank arm and the mass center, by changing the position and size of the mass and also by changing the length of the crank arm.

In the transmission of Figures 11–13 the capacity may be varied in much the same manner and in addition may be changed by driving the gyroscope masses at either a faster or slower rate.

Figures 14, 15, 16:
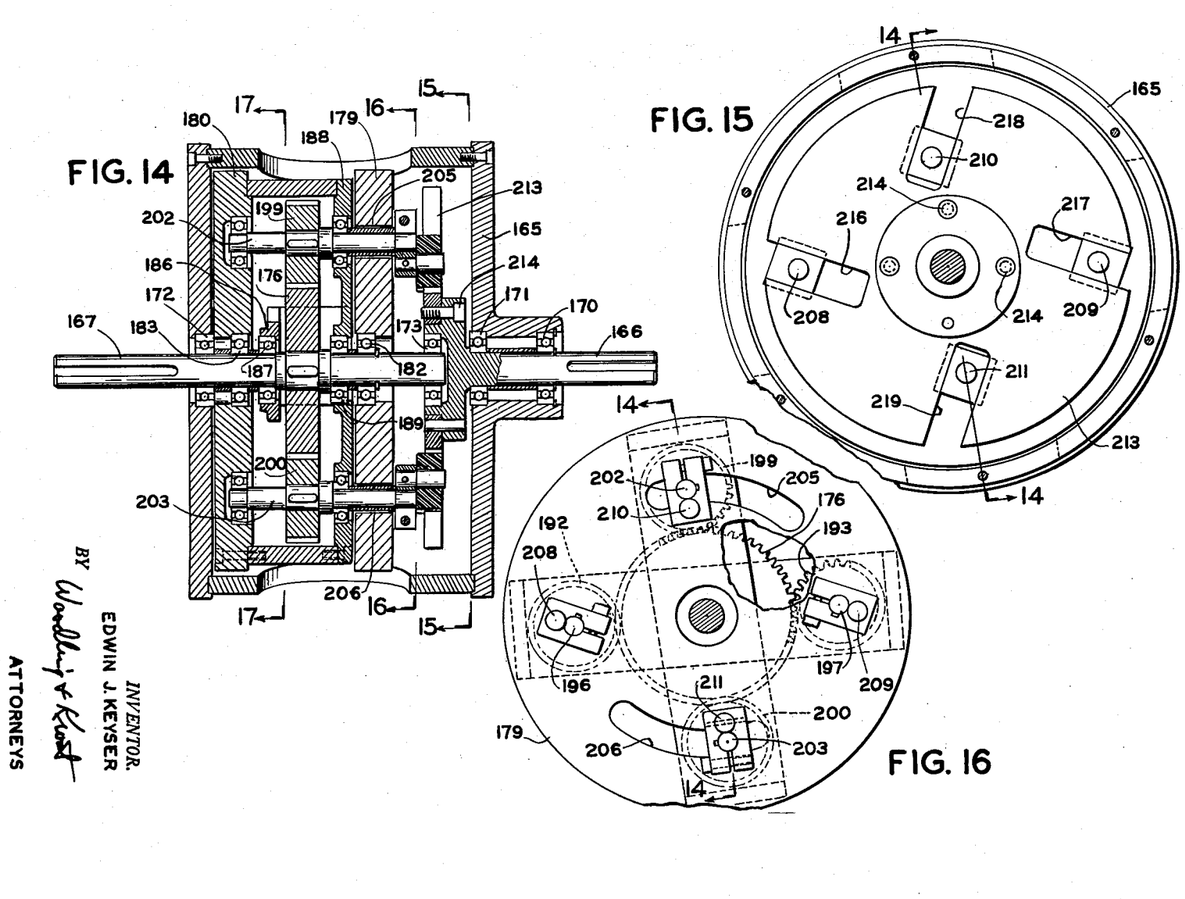
Figure 14 is a side elevational view of another transmission constructed under the teachings of the present invention.
Figure 15 is a view taken generally along the line 15—15 of Figure 14.
Figure 16 is a view taken generally along the line 16—16 of Figure 14.
Figure 17:
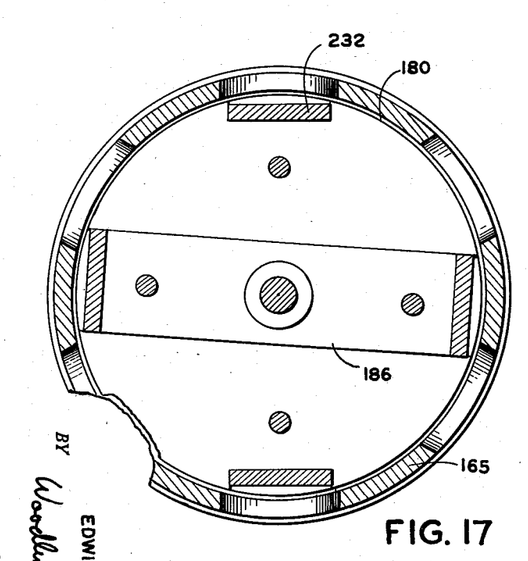
Figure 17 is a view taken generally along the line 17—17 of Figure 14.
Figure 18:
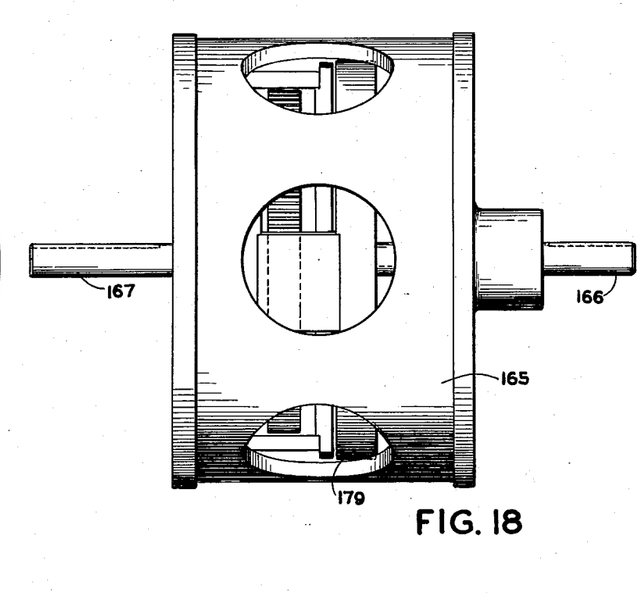
Figure 18 is a view of the transmission of Figure 14 with the case in place.

The transmission shown and described in Figures 14 through 18 as pointed out hereinabove, operates basically on the same principle as do the transmissions of Figures 1–13. A difference is involved in the mechanical operation of the same in that for power to be transmitted from the input to the output shaft there must be a change in the speed of the inertia mass. Another means of explaining the differences between the transmissions of Figures 1–13 and the transmission shown in Figures 14 through 18 may be expressed in this manner. The theory of explanation as will be appreciated is only propounded here in an attempt to enable those reading this disclosure to better understand the same and should be liberally construed. In the transmission of Figure 14, in order to transmit power from the input shaft to the output shaft, it is necessary to maintain a continuous change of speed of rotation of the masses in order to have the necessary forces of acceleration to use as reaction means. Whenever there is no acceleration or in other words when there is no change in speed of the masses then the power transmitted from the input to the output shaft is zero. In the transmissions of Figures 1–13, it will be noted, that in each of those cases the masses are rotating at a radius from the main axis of the transmission. As a result, the forces of acceleration of those masses from the center are the forces utilized in locking the transmissions into high gear or one-to-one gear ratio. No such force of acceleration exists in the transmission of Figures 14 through 18 and as a result, the gear ratio must always be at least slightly less than one-to-one. In order to have a more advantageous arrangement of the functional parts of the transmission under discussion, it is desirable to arrange the slots 216 through 219 into the direction of rotation of the drive plate at an angle to the radius. This gives a more effective lever arm during a greater portion of the cycle of the crank arm and associated parts tending to restrict the rotation of the planet about its axis and giving a smoother and greater transmission of power from the input to the output shaft.

Figure 19:
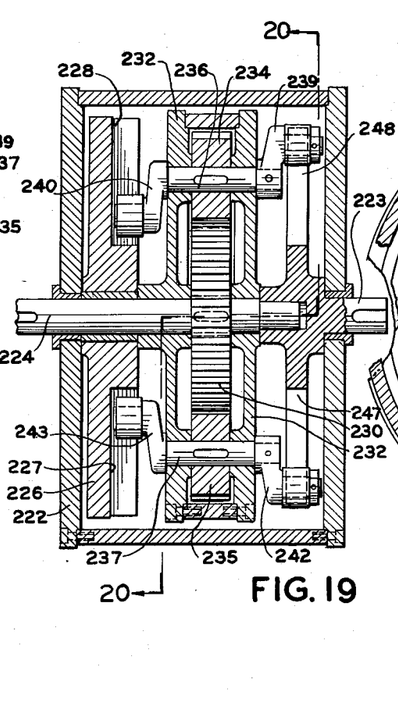
Figure 19 is a side elevational view showing a modification which may be made in the transmission of Figures 14–18.
Figure 20:
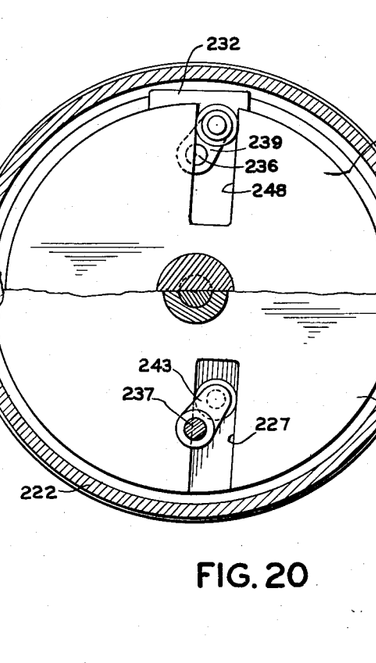
Figure 20 is a view taken generally along the line 20—20 of Figure 19.

The transmission shown and illustrated in Figures 19 and 20 may be compared and understood from a close reference to the transmission of Figures 14–18. The transmission of Figures 19 and 20 includes a housing 222 and supported in the housing and journalled for rotation with respect thereto, are input and output shafts 223 and 224. The transmission of Figures 19 and 20 differs from the transmission of Figures 14–18 in that only a single inertia mass member has been utilized and this inertia mass has been identified by the reference numeral 226. The inertia mass 226 is provided with slots 227 and 228, respectively. The inertia mass member is mounted upon the output shaft 224 and is adapted to rotate with respect thereto. A sun gear 230 is fixedly secured to the output shaft 224 and is adapted to rotate therewith. A planet gear carrier 232 is journalled on the output shaft 224 for independent rotation with respect thereto and first and second planet gears 234 and 235 are connected to shafts 236 and 237 respectively. These planet gears continually engage the sun gear 230 and their respective shafts are journalled by the carrier 232. The shaft 236 is provided with integral crank arms 239 and 240 respectively, which extend from either end of the shaft. The shaft 237 is provided with integral crank arms 242 and 243 respectively, which extend from either end of the shaft. A drive plate 245 is formed as an integral part of the input shaft 223 and is provided with first and second slots 247 and 248. The crank arms 240 and 243 reside in the slots 228 and 227 respectively, in the inertia mass member and the cranks 239 and 242 reside in the slots 248 and 247 respectively, in the drive plate. As mentioned hereinabove the structure and operation of the instant transmission is basically the same as that described in the transmission of Figures 14-18 with the exception that with the use of the additional crank arms 240 and 243 in the inertia mass member 226 the effective capacity of the transmission is proportionately increased.

Figure 21:
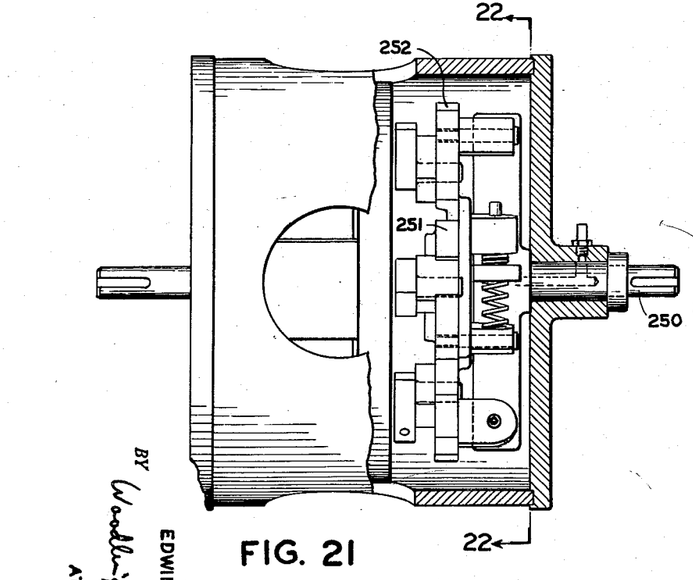
Figure 21 is a side elevational view partially in section illustrating a modification of the transmission shown in Figures 14–18.
Figure 22:
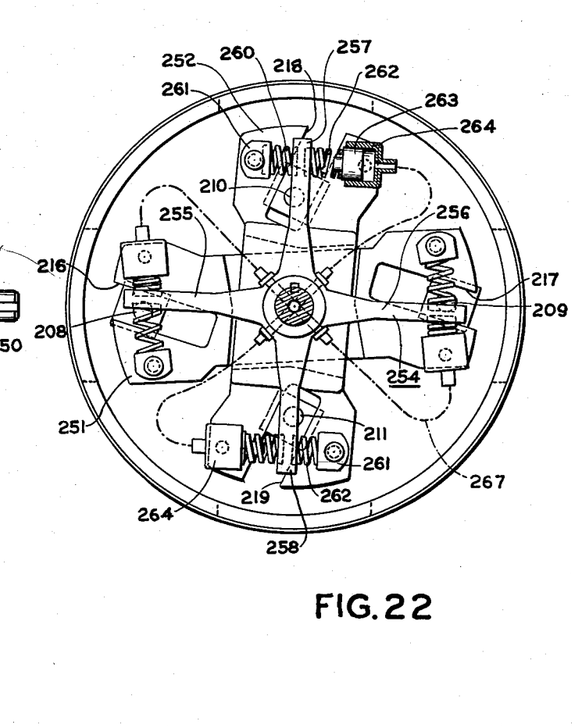
Figure 22 is a view taken generally along the line 22—22 of Figure 21.

The transmission shown and described in Figures 21 and 22 is similar to the transmission shown in Figures 14-18, however, with an improvement thereover. Where like parts have been utilized the same numbers have been applied to Figures 21 and 22 as to the transmission shown in Figures 14-18. Where a difference in structure has resulted, new reference numerals have been utilized. The input shaft in the transmission under discussion has been identified by the reference numeral 250 and the drive plate 213 differs in that it now includes first and second drive plates 251 and 252, respectively. The drive plate 251 is provided with slots 216 and 217 and the drive plate 252 has been provided with slots 218 and 219. The slots hereinabove recited, serve to engage the same crank arms as the structure in Figures 14-18. The input shaft 250 has secured thereto a cross member 254 which transmits power to the first and second drive plates 251 and 252, respectively. The cross member 254 is provided with first, second, third and fourth portions 255—258, respectively. Connection is had between the respective portions 255—258 and the respective first and second drive plates 251 and 252 by means of a plurality of tension control mechanisms. Each of the tension control mechanisms includes a first spring member 260 which engages its respective portion of the cross member at one end and an abutment 261 at the other end. A second spring 262 engages the other side of the cross member portion at one end thereof and the other end engages a piston 263 adapted to travel in a cylinder 264 which is in turn secured to a respective drive plate. The dot dash lines 267 schematically illustrates how fluid pressure may be introduced to each of the cylinders 264 to vary the tension on springs 262. The cross member 254 and the first and second drive plates 251 and 252 and the means interconnecting these elements may be referred to as an input control unit. The function of the input control unit is two-fold. In the average operation under the normal running of the transmission, a slight pulsation in speed of the drive member properly synchronized with the functioning portions of the transmission tends toward smoother operation and is responsible for an increase in capacity. By lessening or increasing the fluid pressure in the piston and cylinder arrangement, the tension in springs 260 and 262 is effectively lessened or increased thereby effectively lessening or increasing the capacity of the transmission. A wide range of capacity control can be accomplished in this manner. It should be pointed out that the first and second drive plates 251 and 252 in this modification are connected to the input shaft only by means of the tension control mechanisms. The drive plates are in effect journalled independently of the input shaft.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A transmission including in combination an input shaft and an output shaft, a carrier operatively secured to said input shaft, a sun gear secured to said output shaft, a plurality of planet gears journalled on said carrier and engaging said sun gear, a crank arm secured to each of said planet gears, a member having slotted means and being directly connected to and driven by said input shaft, said slotted means receiving said crank arms, inertia mass means acting in combination with said crank arm to exert a force through said interengaged planet and sun gear teeth to said output shaft tending to drive the same, said member having said slots being separate from said inertia mass means.

2. A transmission including in combination an input and output shaft, a carrier secured to said input shaft, a sun gear secured to said output shaft, a plurality of planet gears journalled on said carrier and engaging said sun gear, a crank arm on each of said planet gears, a plurality of members each having first and second end portions, pivot means pivotally mounting said first end portion of each of said members to said carrier, wall means on each of said members defining a slot, said crank arm on each planet gear residing in said slot on a respective member, and a mass pivotally secured to said second end portion of each of said members.

3. A transmission including in combination an input and an output shaft, a carrier secured to said input shaft, a sun gear secured to said output shaft, a planet gear journalled on said carrier and engaging said sun gear, a crank arm on said planet gear, a member having first and second end portions, pivot means pivotally mounting said first end portion of said member to said carrier, wall means on said member defining a slot, said crank arm on said planet gear residing in said slot, and a mass pivotally secured to said second end portion of said member.

4. A transmission including in combination an input and an output shaft, a sun gear secured to said output shaft, a carrier, a plurality of planet gears each engaging said sun gear and journalled on said carrier, a crank arm on each said planet gear, a member directly secured to said input shaft and including slotted arms for the reception of each of said respective crank arms, and a mass separate from said member pivotally mounted and operatively connected to said planet gears and spaced from the planet gear axis.

5. A transmission including in combination an input and an output shaft, a sun gear secured to said output shaft, a carrier, a planet gear engaging said sun gear and journalled on said carrier, a crank arm on said planet gear, a member directly secured to said input shaft and including a slot for the reception of said crank arm, and a mass operatively connected to said planet gear to exert a force on said sun gear and output shaft through said planet gear.

6. A transmission including in combination an input and an output shaft, a sun gear connected to said output shaft, a first and second inertia mass member journalled independently and coaxially with said input shaft, first and second planet gears journalled opposite each other on said first inertia mass member and engaging said sun gear, third and fourth planet gears journalled opposite each other on said second inertia mass member and engaging said sun gear, a crank arm operatively secured to each of said planet gears, a member secured to said input shaft and having wall means defining a plurality of slots each of which receive one of said crank arms, said slots being slanted into the direction of rotation of said input shaft and said member.

7. A transmission including in combination an input and an output shaft, a sun gear connected to said output shaft, an inertia mass member journalled independently and coaxially with said input shaft, first and second planet gears journalled opposite each other on said inertia mass member and engaging said sun gear, a crank arm secured to each of said planet gears, and a member directly secured to said input shaft and having wall means defining a plurality of slots each of which receive one of said crank arms.

8. A transmission including in combination an input shaft and an output shaft, a sun gear secured to said output shaft, a carrier secured to said input shaft and driven thereby, a first and second planet gear journalled by said carrier and engaging said sun gear, a crank arm connected to each of said planet gears, first and second slotted arms each having first and second end portions, pivot means pivotally mounting said first end portion of said first and second slotted arms to said carrier, said crank arms residing respectively in said slots of said first and second slotted arms, first and second gyroscopes, means pivotally mounting said gyroscopes to said carrier to oscillate on axes generally transverse to said input shaft, means for revolving said first and second gyroscopes about their axes, and connection means connecting said second end portions of said first and second slotted arms to said first and second gyroscopes respectively.

9. A transmission including in combination an input shaft and an output shaft, a primary gear secured to said output shaft, a carrier secured to said input shaft and driven thereby, a secondary gear journalled by said carrier and engaging said primary gear, a crank arm connected to said secondary gear, a slotted arm having first and second end portions, pivot means pivotally mounting said first end portion of said slotted arm to said carrier, said crank arm residing in said slot of said slotted arm, a gyroscope, means pivotally mounting said gyroscope to said carrier to rotate on an axis generally transverse to said input shaft, means for revolving said gyroscope about its axis, and connection means connecting said second end portion of said slotted arm to said gyroscope.

10. A transmission including in combination an input and output shaft, a primary gear connected to said output shaft, a carrier journalled independently and coaxially with said input shaft, first and second secondary gears, first and second pivot shafts journalling said first and second secondary gears on said carrier with each of said secondary gears in engagement with said primary gear, an inertia mass member journalled independently and coaxially with said input shaft, a drive member secured to and driven by said input shaft, a crank arm secured to either end of each said first and second pivot shafts, said inertia mass and said drive member each having first and second slots, said crank arms on one end of said first and second pivot shafts residing in said first and second slots of said drive member and said crank arms on the other end of said first and second pivot shafts residing in said first and second slots of said inertia mass member.

11. A transmission including in combination an input and an output shaft, a primary gear connected to said output shaft, an inertia mass member journalled independently and coaxially with said input shaft, first and second secondary gears journalled by said inertia mass member and engaging said primary gear, a crank arm secured to each of said secondary gears, a slotted member journalled independently and coaxially with said input shaft, said member having wall means defining a plurality of slots each of which receive one of said crank arms, a drive member secured to said input shaft, and spring means between said drive member and said slotted member for transmitting movement between said input shaft and said slotted member.

12. A transmission comprising an input shaft, an output shaft, a primary gear secured to said output shaft, a secondary gear having a crank arm and continuously engaged with said primary gear, slotted member means directly connected to and rotatable by and in accordance with said input shaft and having a slot for the reception of said crank arm, and a means connected between said input and output shafts including a journalled inertia mass means acting through said secondary gear to exert a force through said engaged secondary and primary gear teeth to said output shaft tending to drive the same.

References Cited in the file of this patent

UNITED STATES PATENTS

| | | |
|---|---|---|
| 1,632,696 | Coleman | June 14, 1927 |
| 1,680,899 | McCall | Aug. 14, 1928 |
| 1,906,103 | Ryan | Apr. 25, 1933 |

FOREIGN PATENTS

| | | |
|---|---|---|
| 564,111 | France | Oct. 13, 1923 |